United States Patent [19]
Smoot

[11] 3,928,898
[45] Dec. 30, 1975

[54] UPHOLSTERY ATTACHER

[75] Inventor: Edward H. Smoot, Holcomb, N.Y.

[73] Assignee: The Schlegel Manufacturing Company, Rochester, N.Y.

[22] Filed: Sept. 16, 1974

[21] Appl. No.: 506,740

Related U.S. Application Data

[63] Continuation of Ser. No. 336,918, March 1, 1973, abandoned, which is a continuation-in-part of Ser. No. 249,307, May 1, 1972, abandoned.

[52] U.S. Cl. ............... 24/259 FS; 5/353.3; 297/218
[51] Int. Cl.² .................. A47C 27/00; A44B 21/00
[58] Field of Search ............... 160/382, 402–404; 297/218, 219, 452; 5/335, 353.3; 24/73 FT, 230.5 R, 265 C, 259 FS, 259 TF, 259 FF

[56] References Cited
UNITED STATES PATENTS

| | | |
|---|---|---|
| 2,424,740 | 7/1947 | Chamberlain et al. .......... 24/230.5 R |
| 2,738,835 | 3/1956 | Eames ........................... 297/218 UX |
| 2,800,742 | 7/1957 | Derr et al. ............................ 160/404 |
| 3,025,104 | 3/1962 | Murphy ................................ 297/218 |
| 3,125,156 | 3/1964 | Grimshaw ......................... 160/404 X |
| 3,179,469 | 4/1965 | Heuston .......................... 160/382 X |
| 3,198,689 | 8/1965 | Lansing .................... 24/259 FS UX |

FOREIGN PATENTS OR APPLICATIONS

| | | |
|---|---|---|
| 548,499 | 11/1957 | Canada ............................... 5/353.3 |
| 1,344,433 | 10/1963 | France ............................ 24/259 FS |
| 1,295,281 | 5/1969 | Germany ........................ 24/259 TF |
| 839,143 | 6/1960 | United Kingdom ................. 297/218 |

Primary Examiner—Donald A. Griffin
Attorney, Agent, or Firm—Cumpston & Shaw

[57] ABSTRACT

A length of flexible, non-stretchable carrier material that is both bendable and twistable is formed into a hook shape in cross section for hooking over a support edge in a body to be upholstered, and a flange extends from the shank portion of the hook shape along the length of the carrier material so that the upholstery can be stitched to the flange and held tightly in place when the hook shape is secured over the supporting edge. Zig zag wire, zig zag plastic monofilament and perforated metal can be used for the carrier, and the flange is preferably fabric, fabric-reinforced plastic, or a shank extension of a zig zag plastic monofilament carrier strip.

14 Claims, 16 Drawing Figures

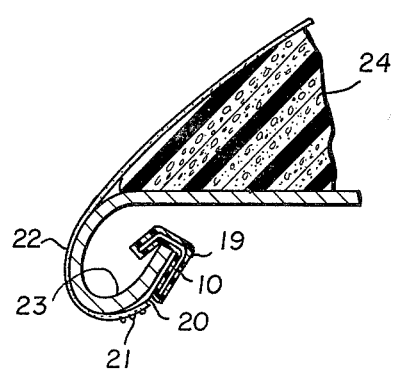
FIG. 1
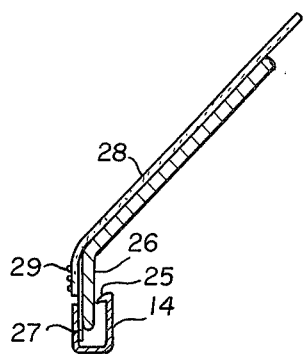
FIG. 2
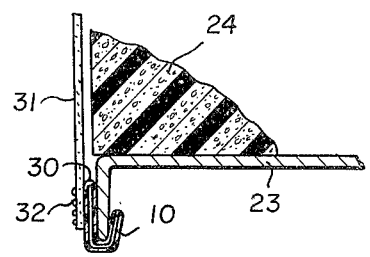
FIG. 3
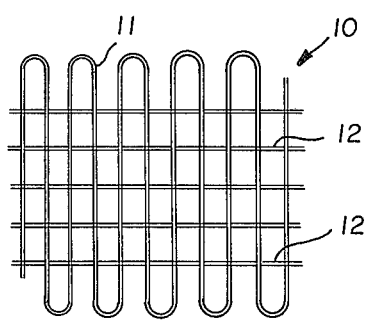
FIG. 4
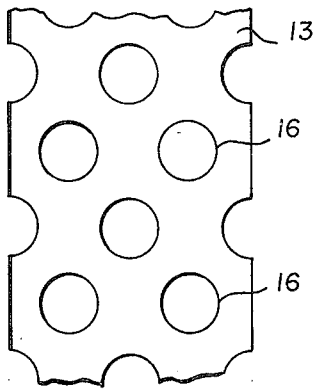
FIG. 5
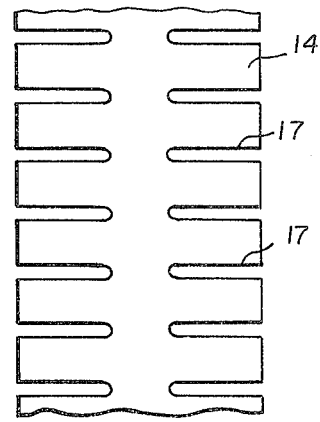
FIG. 6
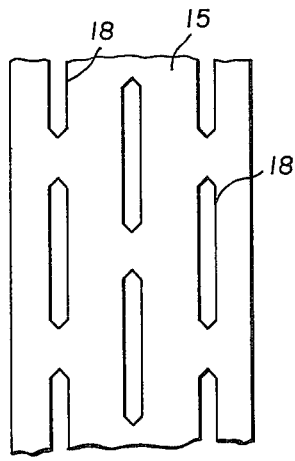
FIG. 7
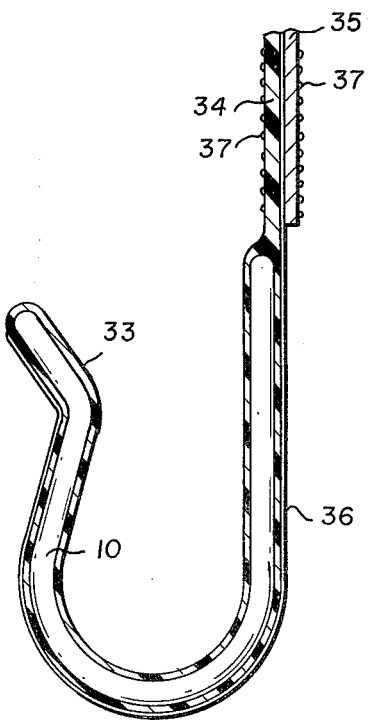
FIG. 8
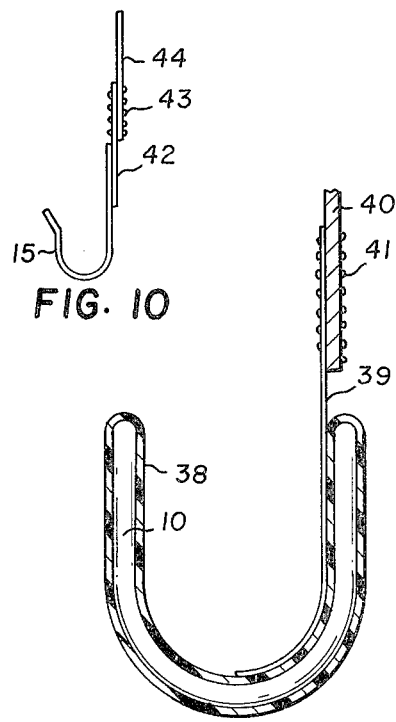
FIG. 9
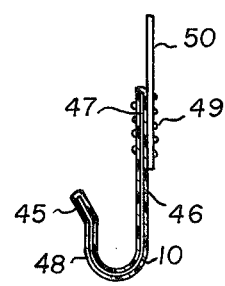
FIG. 10
FIG. 11

3,928,898

UPHOLSTERY ATTACHER

RELATED APPLICATION

This is a continuation of application Ser. No. 336,918 filed Mar. 1, 1973 now abandoned, which was a continuation-in-part of application Ser. No. 249,307 filed May 1, 1972 now abandoned.

THE INVENTIVE IMPROVEMENT

Upholstery has been fastened in place in many ways including staples, nails, tacks, stitching, spaced hooks secured to the upholstery and even hog rings. These methods are laborious, expensive, or unreliable, and the invention involves recognition of a way to improve on such methods. The invention seeks simplicity, economy, ease of installation, secure holding ability, versatility and reliability in an upholstery attacher.

SUMMARY OF THE INVENTION

The inventive upholstery attacher uses a length of flexible, non-stretchable carrier material that is both bendable and twistable, and is formed into a hook shape in cross section. A flange extends away from the shank portion of the hook shape along the length of the carrier material, and stitching secures the upholstery to the flange. Then, when the hook shape is secured over a support edge in a body to be upholstered, the upholstery is held tightly in place.

DRAWINGS

FIGS. 1 – 3 are fragmentary, cross-sectional views of alternative preferred embodiments of the inventive upholstery attacher secured in place on an upholstered body;

FIGS. 4 – 7 are plan views of alternative preferred carrier materials for the inventive upholstery attacher;

FIGS. 8 – 11 are fragmentary, cross-sectional views of alternative embodiments of the inventive upholstery attacher;

DETAILED DESCRIPTION

Figure 12:
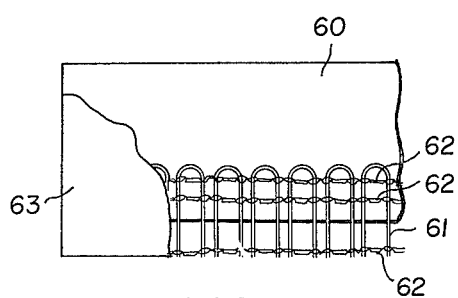
FIG. 12 is a partially schematic, elevational view of the shank side of a preferred embodiment of the inventive upholstery attacher.

FIGS. 1 – 3 show preferred applications of the inventive upholstery attacher to upholstered bodies, and preferred details of construction of upholstery attachers according to the invention are shown in FIGS. 4 – 11. Generally a long, flexible carrier is formed into hook shape in cross section so that it can be hooked over a support edge in a body to be upholstered. The carrier has a flange extending away from the shank portion of the hook shape, and the upholstery is stitched to the flange so that the upholstery is held tightly in place when the hook shape is secured over the supporting edge. It is important that the carrier material be both bendable and twistable to be able to follow curvatures around the body to be upholstered, and the flange is preferably non-stretchable, capable of holding stitches securing the upholstery in place, and securely attached to the hook shape. Recognition of these requirements is involved in the invention which also suggests preferred materials and construction methods for making such an upholstery attacher.

Preferred forms of carrier materials for the inventive upholstery attacher are shown in FIGS. 4 – 7. Stitched, zig zag carrier 10 of FIG. 4 is formed of a monofilament 11 of metal wire or plastic material bent back and forth in a zig zag pattern as illustrated and held in such a pattern by stitching 12 interlocking the straight lengths of monofilament 11 together. Such a zig zag carrier is generally known for other purposes, and machinery exists for forming and stitching carrier 10 together. The characteristics of carrier 10 include high strength, economy, and the capacity for flexibly bending and twisting around curves and turns. Carrier 10 is preferred for most forms of the inventive upholstery attacher.

Carriers 13, 14 and 15 respectively shown in FIGS. 5, 6 and 7, are formed of metal strips having perforations 16 – 18. Other forms of perforations can also be made in metal strips to make the strips bendable, twistable and flexible enough to serve as carriers for an upholstery attacher. Perforated metal strips are also known as carriers for other purposes, and machinery exists for making such strips.

Carrier 10 is preferably coated with a plastic covering material for further strength and improved appearance, but may be used in uncoated form. Perforated carrier strips 13 – 15 are generally stronger and can be used either with or without a plastic covering. Either type of carrier strip is formed into a hook shape in cross section and has a flange for attaching to upholstery material.

As shown in FIG. 1, carrier 10 is formed into a hook shape and covered with a plastic coating 19. A flange 20 of fabric material is bonded to plastic coating 19 in the shank region of the hook shape of carrier 10 and extends outward from carrier 10. Stitching 21 secures upholstery 22 to flange 20 so that when carrier 10 is hooked over support edge 23 of a body such as an automobile seat or a piece of furniture, upholstery 22 is held tightly in place over padding material 24. Flange 20 is preferably fused or bonded securely to plastic coating 19 at the inside of the shank portion of the hook shape of carrier 10, and flange 20 affords a non-stretchable and flexible element that can receive and hold stitches 21 securing upholstery 22 in place.

As shown in FIG. 2, a perforated metal strip carrier such as carrier 14 is formed into a hook shape with a barb 25 for biting into support edge 26 of a body to be upholstered. Carrier 14 is uncoated as shown in FIG. 2, but can also have a plastic coating. A flange 27 of fabric or fabric-reinforced plastic material is bonded securely to the shank portion of the hook shape of carrier 14 to extend outward from carrier 14 as illustrated, and upholstery 28 is attached to flange 27 by stitching 29. Hook shape carrier 14 and barb 25 then secure upholstery 28 tightly in place over support edge 26.

Carrier 10 of the embodiment of FIG. 3 is a stitched zig zag monofilament of plastic material formed into a hook shape as illustrated with the shank leg of the hook extending outward to form a flange 30. Carrier 10 is preferably covered with an extruded coating of plastic material, but can be used uncoated. Upholstery 31 is then secured directly to flange 30 by stitching 32. This is possible when carrier 10 is formed of plastic monofilament rather than metal wire so that if the sewing machine that puts stitching 32 in place happens to pierce the monofilament 11 of carrier 10, the sewing machine needle will not be broken or damaged as would occur if carrier 10 were made of metal wire. The embodiment of FIG. 3 thus eliminates a separate flange.

The embodiment of FIG. 3 has several other advantages. When carrier 10 is formed of metal wire and lengths are cut to size for use, wire ends extending out of the cut can be sharp and dangerous to people handling the material. This has required special plastic coatings over the severed ends, but such a plastic coating is not necessary when carrier 10 is formed of monofilament plastic material. The plastic monofilament is generally not as strong as metal wire, but especially when covered with a plastic coating, the plastic carrier is strong enough to hold its hook shape and support upholstery 31 securely in place.

The embodiment of FIG. 8 uses a carrier 10 of stitched zig zag wire or plastic monofilament covered with a plastic coating 33 which extends outward from the shank end of the hook shape of carrier 10 to form an integral flange 34. If plastic flange 34 is made thin enough for stitching to upholstery 35, it is stretchable and deformable and hence unsatisfactory. To remedy this, a reinforcing fabric 36 is securely bonded to plastic coating 33, preferably around the outside of the hook shape of carrier 10, and extends up the shank portion of the hook and into flange 34 for strengthening and reinforcing flange 34. Then stitching 37 secures upholstery 35 to flange 34 and its reinforcing fabric 36 to form a non-stretchable and non-deformable connection with hook carrier 10 to secure upholstery 35 tightly in place.

FIG. 9 shows an embodiment similar to FIG. 1 with a preferably zig zag carrier 10 covered with a plastic coating 38 and having a fabric flange 39 extending outward from the shank portion of the hook shape carrier 10. Flange 39 is bonded securely to plastic coating 38 and is non-stretchable and flexible to support upholstery 40 securely in place by stitching 41.

The embodiment of FIG. 10 uses a perforated metal strip carrier such as carrier 15 and has a fabric flange 42 bonded securely to the outside of the shank portion of the hook of carrier 15 to extend outward from the shank as illustrated. Stitching 43 then secures upholstery 44 securely to flange 42 to be stretched in place when carrier 15 is hooked in place over a body to be upholstered.

The embodiment of FIG. 11 is similar to the embodiment of FIG. 3 in using a carrier 10 of a zig zag monofilament of plastic material. One edge of carrier 10 is formed into a hook shape 45, and the shank portion 46 of hook 45 extends outward integrally into flange 47. With carrier 10 made of monofilament plastic material, and preferably covered with a plastic coating 48, stitching 49 can be driven directly through flange 47 and upholstery 50 for holding upholstery 50 securely to hook 45.

In addition to the methods described above for securing a fabric flange to a zig zag carrier 10 such as shown in FIG. 4, a fabric flange can also be stitched or knitted to carrier 10 by the same stitching 12 that secures the legs 11 of carrier 10 in place. A fabric flange is then overlapped with carrier 10 as stitching 12 is applied so that the flange and the carrier emerge secured together. Also, the machine for knitting in stitches 12 can also be adapted to form a knitted fabric flange extending outward from carrier 10 without using a separate piece of fabric. The upholstery can then be stitched to the knitted flange either externally of carrier 10 or through carrier 10, if carrier 10 is formed of plastic monofilament.

FIG. 12 shows a flange 60 secured to a zig zag wire carrier 61 by two rows of the stitching 62 that is used to interlock the wire loops together. Flange 60 can be a woven fabric material, or a non-woven fibrous material and is overlapped with the loops of carrier 61 in the carrier forming machine so that stiching 62 is driven through flange 60 as the wire loops are interlocked together. A single row of stitching 62 or three or more rows of stitching 62 can also be used to secure flange 60 to carrier 61. This simplifies the construction of the attacher which emerges completed from the carrier forming machine.

After carrier 61 is formed into a hook shape, spots of plastic material 63 are applied to carrier 61 at predetermined regions where carrier 61 is to be cut into lengths. Then each cut of carrier 61 is made through plastic material 63 which holds stitching 62 in place and prevents wire ends from protruding where they can injure people.

Figure 13:
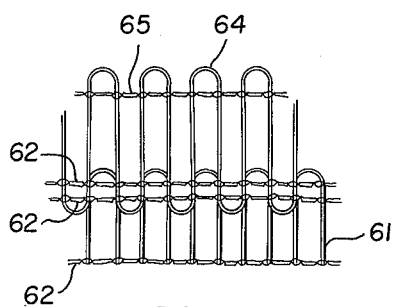
FIG. 13 is a partially schematic, elevational view of the shank side of another preferred embodiment of the inventive upholstery attacher.

The attacher of FIG. 13 uses the same wire carrier 61 having loops secured together with stitching 62, but its flange 64 is formed of zig zag material such as yarn, cord, or monofilament formed of fibrous materials, paper, or plastic. The loops of flange 64 overlap with the loops of carrier 61, and flange 64 is secured to carrier 61 by rows of stitching 62 that interlock each set of loops together. An additional one or more rows of stitching 65 interlocks the loops of flange 64 together. The embodiment of FIG. 13 also can be made in a modified form of a carrier-forming machine.

Stitching 62 is preferably covered with a thin coating of a plastic or elastomeric material to hold stitching 62 in the desired position on carrier 61. This prevents stitching rows from sliding out of place and letting the loops of carrier 61 spread or distort from their desired shape. Many different coatings are available to accomplish this, and a stitching coating is preferably applied during or immediately after the carrier forming operation.

An open loop carrier 61 that is not completely covered by a plastic material has been found to have several advantages. Not only is it simpler and cheaper to make, and requires less material, but the loops of the carrier can be spread apart in attaching the carrier over obstructions around the seat edge. Some automotive seat edges are formed as wire frames, and occasional wires extending away from the seat edge tend to obstruct the attachment of the hook-shaped attacher. However, when the wire loops of carrier 61 are uncovered, they can be spread apart to straddle such a seat wire so it does not interfere with the placement of the attacher. For larger obstructions, regions of attacher 61 can be cut away, and for any such cut-outs plastic material 63 is preferably formed over carrier 61 to hold stitching 62 in place and guard the edges of the cutout. Also, the inventive attacher can be led over or around many obstructions without impairing its grip on the seat edge.

For some applications of the inventive upholstery attacher it has been found desirable to make the flange stretchable in at least one direction for adjusting to the tension on the upholstery material to keep the upholstery evenly tensioned in place. In typical practice, the upholstery is stitched to the flange, but fusing, riveting, or other upholstery securing means can be used.

Figure 14:
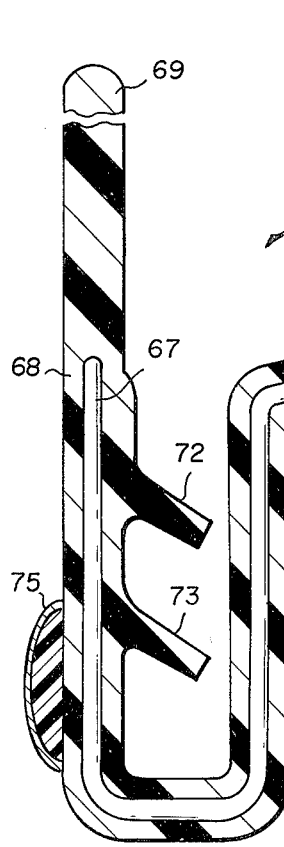
FIG. 14 is a cross-sectional view of another preferred embodiment of the inventive upholstery attacher.
Figure 15:
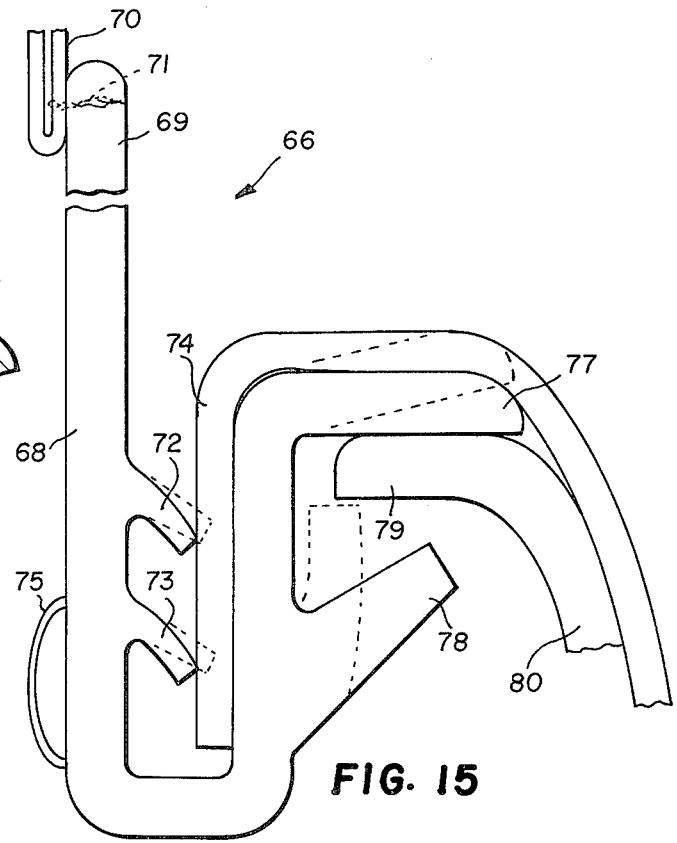
FIG. 15 is a cross-sectional view of the upholstery attacher of FIG. 14 applied to an automotive seat assembly.

The upholstery attacher 66 of FIGS. 14 and 15 is specially designed for an automotive seat upholstering system where the attacher is visible and must be attractive, and the attacher not only holds the upholstery over the seat, but also holds a back cover in place.

Attacher 66 has a stitched, zig zag wire carrier 67 bent into a hook shape as illustrated. A plastic covering material is extruded over carrier 67 to cover carrier 67 completely, and plastic 68 extends outward from one edge of carrier 67 to form a flange 69 to which upholstery 70 is secured by stitching 71 as illustrated. It has been found in practice that flange 69 can be properly sized and dimensioned of plastic material to hold upholstery 70 securely without any fabric or other reinforcer in flange 69.

Plastic 68 is also formed with one or more barbs 72 that angle into the hook shape central region inside carrier 67 to serve as retainer barbs for holding attacher 66 onto the edge of a metal seat shell 74. As shown in FIG. 15, attacher 66 has been fitted over seat edge 74 to hold upholstery 70 in place over the front of the seat.

The shank side of the hook shape of attacher 66 from which flange 69 extends carries a decorative strip 75 preferably formed of plastic material having a simulated bright metal appearance to make attacher 66 attractive. Also, the exterior of plastic 68 is preferably embossed in an attractive pattern.

The opposite side of the hook shape is bent outward in a projection 76 covered by a plastic 77, and a plastic retainer projection 78 is spaced from projection 77 as illustrated. Then, the edge 79 of a plastic seat back cover 80 is snapped in between projection 77 and 78 to hold back cover 80 in place on seat shell 74. The deformation to accommodate movement of edge 79 in between projections 77 and 78 is shown in broken lines in FIG. 15, and the solid lines of FIG. 15 shows a final interlocking relationship between attacher 66, seat shell 74 and back cover 80. The result is a double functioning of attacher 66 in not only holding upholstery 70 in place, but also securing back cover 80 in place with a single, simple, attractive device.

Figure 16:
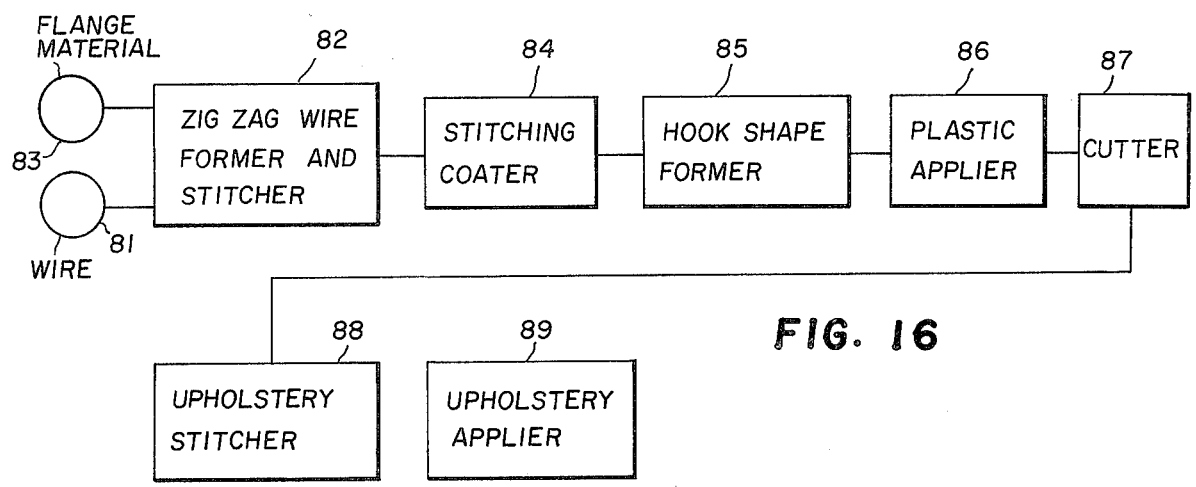
FIG. 16 is a schematic diagram of a preferred upholstering method according to the invention.

Preferred steps in the inventive upholstery attaching method are shown in the schematic diagram of FIG. 16. A wire or plastic monofilament 81 is fed to a zig zag wire former and stitcher 82 along with a supply of flange material 83 such as a strand to be formed as a zig zag flange 64 of FIG. 13 or a tape or ribbon of material to form a flange 60 of FIG. 12. Either way, zig zag former and stitcher 82 forms a wire carrier with an attached flange.

The stitching securing carrier loops together is preferably coated with a plastic or elastomeric material in stitching coater 84, and the carrier is formed into a hook shape in former 85. Plastic is applied to the length cutting regions of the carrier in plastic applier 86, and a cutter 87 cuts the attacher into the desired lengths. Upholstery is stitched to the flange of the attacher in stitcher 88, and the upholstery is applied to the seat or other body to be upholstered in applier 89. This is preferably accomplished in a press that compresses the upholstered body so that the carrier can be hooked over its edge, and then releases the upholstered body to tension the upholstery properly in place. Obstructions around the edge of the body are preferably straddled by spreading the loops of the wire carrier, but the carrier can also have cutouts for obstructions. Furthermore, the carrier can be bent around and led clear of or over many obstructions around the upholstered body without impairing its attachment to the body.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the various materials and constructions possible in using the invention to attach upholstery to different structures.

I claim:

1. An upholstery attacher comprising:
   a. a substantial length of flexible, non-stretchable carrier material that is both bendable and twistable and is formed into a self-maintaining hook shape in cross section continuously throughout said substantial length;
   b. a continuous flange of a separate and generally plane and flexible material secured to said carrier and extending away from the shank portion of said hook shape along said substantial length of said carrier material;
   c. means for fastening a peripheral edge of said upholstery to said flange along the entire longitudinal length of said flange;
   d. a support edge extending along a cushioned body to be upholstered and along said peripheral edge of said upholstery;
   e. said upholstery being shaped for covering said cushioned body and said peripheral edge of said upholstery extending to within a predetermined distance from said support edge; and
   f. said hook shape being sized and formed of a material having sufficient strength to hook over and maintain a position following along said support edge along the substantial length of said carrier material, and said flange having sufficient strength to pull said upholstery evenly over said cushioned body and closer to said support edge and to hold said upholstery tightly in place.

2. The upholstery attacher of claim 1 wherein said flange is formed of fabric material secured to said carrier material.

3. The upholstery attacher of claim 1 wherein said carrier material is covered with a coating material, and said flange is formed of an extension of said coating material and a reinforcing fabric material.

4. The upholstery attacher of claim 1 wherein said carrier material is formed of zig zag element with stitching holding loops of said element in place, and said flange is secured to said element by some of said stitching holding said loops.

5. The upholstery attacher of claim 4 wherein said flange is formed of non-woven, fibrous cloth material.

6. The upholstery attacher of claim 1 wherein said carrier material is formed of a zig zag element with stitching holding loops of said element in place, and said flange is formed of zig zag loops of material overlapped with said carrier and secured to said carrier by some of said stitching holding said loops.

7. The upholstery attacher of claim 6 including additional stitching holding said loops of said flange in place.

8. The upholstery attacher of claim 1 wherein a covering material covers said carrier and extends outward from said shank portion of said hook shape to form said flange.

9. The upholstery attacher of claim 8 wherein covering material also forms a retainer barb angling into said hook shape to retain said attacher on said support edge.

10. The upholstery attacher of claim 9 wherein the edge of said hook shape opposite said shank is curved outward, and said covering material forms a retainer projection spaced from said outward curved hook edge to retain a cover edge between said projection and said hook edge.

11. An upholstering method comprising:
   a. forming a zig zag wire carrier using stitching for holding the loops of said zig zag wire together and securing a flange material to said zig zag wire loops to extend outward from one edge of said carrier;
   b. forming said carrier into a hook shape so said flange extends outward from a shank portion of said hook shape;
   c. cutting off a length of said carrier;
   d. securing the periphery of a piece of upholstery material to said flange along said length of said carrier; and
   e. hooking said length of said carrier over an edge of a body to hold said upholstery material in place relative to said body.

12. The upholstering method of claim 11 including forming said flange as zig zag loops of material overlapping said wire loops of said carrier, using some of said stitching to secure said flange loops to said carrier, and using additional stitching to secure said flange loops together.

13. The upholstering method of claim 11 including covering said carrier with a covering material extending outward from said hook shank to form said flange.

14. An automobile seat upholstering system comprising:
   a. a metal shell for said seat;
   b. a back cover for said seat;
   c. an upholstery attacher secured to the edge of said shell;
   d. said upholstery attacher being formed of zig zag wire with stitching holding loops of said wire in place;
   e. a plastic material completely covering said carrier and extending outward from one edge of said carrier to form a flange;
   f. said carrier being formed into a hook shape with said flange extending from the shank portion of said hook shape;
   g. upholstery material secured to said flange to extend over and cover said seat;
   h. said plastic material forming a retainer barb angling into said hook shape to retain said carrier on said shell edge;
   i. the edge of said hook shape opposite said shank being curved outward, and said plastic material forming a retainer projection spaced from said outward curved hook edge; and
   j. the edge of said back cover being lodged between said projection and said hook edge to hold said back cover to said seat.

* * * * *